(12) United States Patent
Sasaki et al.

(10) Patent No.: US 6,810,934 B2
(45) Date of Patent: Nov. 2, 2004

(54) LAMINATION SYSTEM

(75) Inventors: Naotaka Sasaki, Kiryu (JP); Kenji Sugaya, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 21 days.

(21) Appl. No.: 10/141,556

(22) Filed: May 9, 2002

(65) Prior Publication Data

US 2002/0166635 A1 Nov. 14, 2002

(30) Foreign Application Priority Data

May 14, 2001 (JP) ........................................ 2001-142540

(51) Int. Cl.$^7$ ............................................. B32B 31/00
(52) U.S. Cl. ..................... 156/521; 156/583.1
(58) Field of Search ........................................ 156/521

(56) References Cited

U.S. PATENT DOCUMENTS

| | | | |
|---|---|---|---|
| 3,078,021 A | * | 4/1961 | Crownfield et al. .......... 226/21 |
| 4,976,558 A | * | 12/1990 | Kuzuya et al. .......... 400/615.2 |
| 5,226,643 A | * | 7/1993 | Kriegel et al. ................ 271/50 |
| 5,783,024 A | | 7/1998 | Forkert |
| 5,807,461 A | | 9/1998 | Hagstrom |
| 6,138,885 A | * | 10/2000 | Hevenor et al. .............. 226/16 |
| 6,159,327 A | | 12/2000 | Forkert |
| 6,283,188 B1 | * | 9/2001 | Maynard et al. ............ 156/521 |

* cited by examiner

*Primary Examiner*—Richard Crispino
*Assistant Examiner*—Michelle Acevedo Lazor
(74) *Attorney, Agent, or Firm*—Birch, Stewart, Kolasch & Birch, LLP

(57) ABSTRACT

A lamination system comprises; a film transfer means for transferring along a first transfer path a continuous film chosen from more than two kinds of films different in width, a cutting means provided along the first transfer path for cutting the film in a predetermined length, a card transfer means for transferring an ID card along a second transfer path that converges with the first transfer path at a predetermined point of conversion, a thermocompression bonding means for laminating the film cut on a surface of the ID card at the downstream of the point of conversion. The lamination system is provided with guide members for restricting the transverse movement of the film within a distance corresponding to the maximum width of the films, and alignment means for aligning the film along a desired side end of the first transfer path.

2 Claims, 7 Drawing Sheets

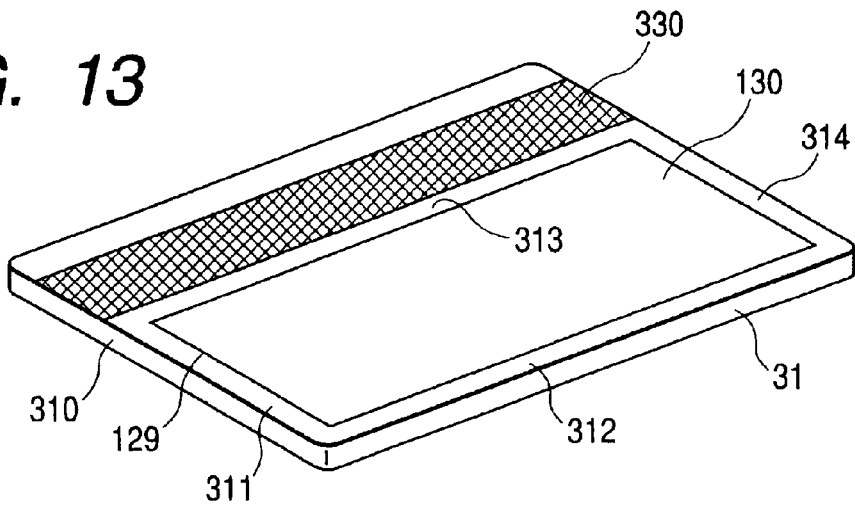
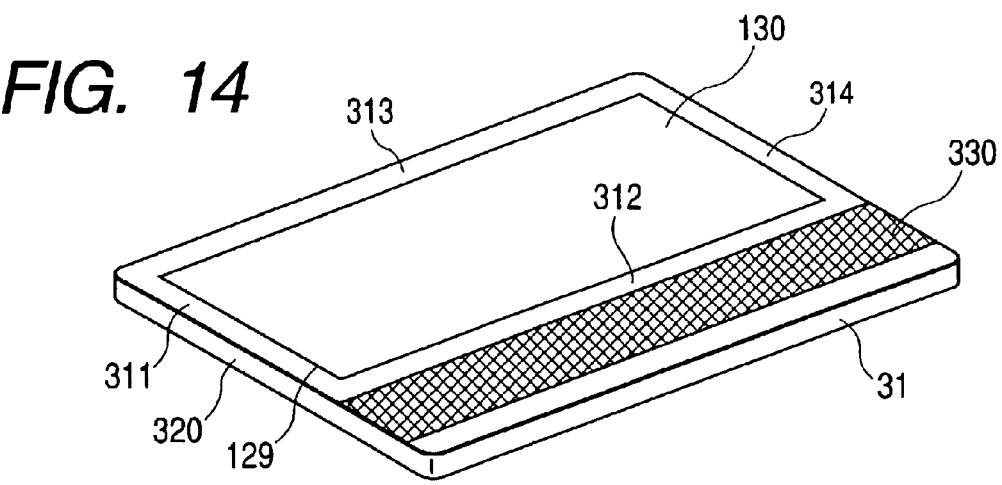
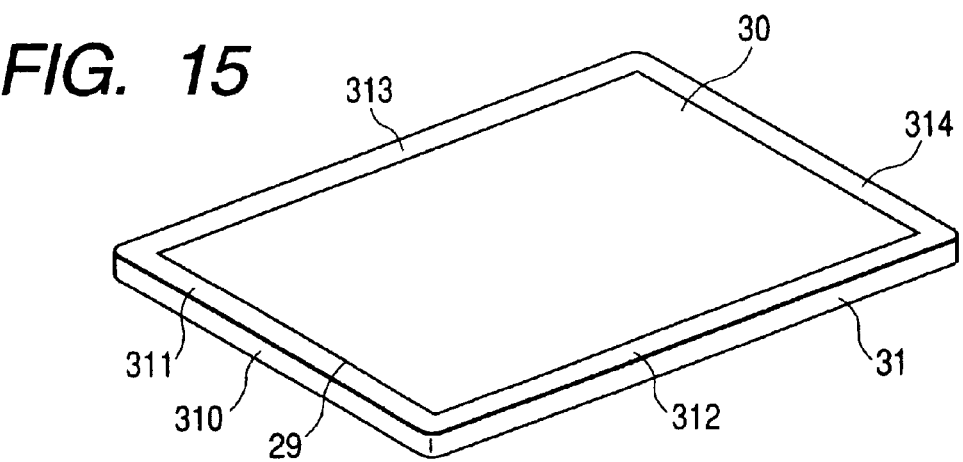

LAMINATION SYSTEM

BACKGROUND OF THE INVENTION

1. Field of the Invention

The present invention concerns a lamination system for thermocompression bonding of a transparent film on a surface of an ID card on which such as a photograph of a person and personal data are printed. More specifically, the present invention concerns a wasteless type lamination system for laminating a surface of an ID card with a transparent film chosen from films different in width, successively cutting the continuous film that has been rolled in a supply roll into a predetermined length.

2. Description of the Prior Art

Recently, ID cards of various type are being widely used. In order to protect an ID card from tampering or to improve the life of the ID card, a transparent film of about 30 microns in thickness is laminated by a thermocompression bonding on a surface of the ID card on which information data are printed. Lamination systems such as disclosed in U.S. Pat. Nos. 5,807,461, 5,783,024 and 6,159,327 are known as systems suitable for such lamination.

In a lamination system disclosed in U.S. Pat. No. 5,807,461, a transparent film pre-cut in a predetermined shape (a patch) is mounted on a carrier (a base sheet). The carrier is provided with sensor marks (index markings) for detecting position of the pre-cut patch on the carrier. The lamination system detects the sensor mark prior to the lamination to detect the position of the pre-cut patch, then tears the patch from the carrier and laminates the patch on a surface of a printed ID card by thermocompression bonding. Such lamination system is undesirable in view of the operation cost and the protection of environment, since the carrier is thrown away as waste material.

The above problem has been solved in lamination systems such as disclosed in U.S. Pat. No. 5,783,024 and U.S. Pat. No. 6,159,327 and these systems are being practically used. In these lamination systems, a leading edge of a continuous transparent laminate film is drawn out from a supply roll, then transferred along a supply path, then cut in a predetermined length, then the cut laminate film is laid on a printed ID card transferred along another supply path at the convergence zone of the two supply paths, and then laminated on the surface of the ID card by thermocompression bonding using a heat roller provided at the downstream. These lamination systems, called wasteless type lamination systems, are advantageous since the laminate film is used after being cut in a necessary length, and accordingly, no waste carrier such as in the lamination system disclosed in U.S. Pat. No. 5,807,461 is left.

Further in U.S. Pat. No. 6,159,327, a lamination system for laminating both faces of an ID card using apparatuses similar to that disclosed in U.S. Pat. No. 5,783,024 is disclosed.

In the lamination system disclosed in U.S. Pat. No. 5,783,024, only a laminate film having a width of one kind can be used. In the lamination system disclosed in U.S. Pat. No. 6,159,327, two laminate films each having a different width with each other can be used. In this lamination system, however, each of laminate films having a certain predetermined width can only be laminated on a face or a back of an ID card. Accordingly, in case that an ID card such as shown in attached FIG. 6 on a surface of which a magnetic stripe 330 is provided is to be laminated, the input direction of the card into the lamination system must be restricted.

Thus, in the lamination system such as disclosed in U.S. Pat. No. 5,783,024 or U.S. Pat. No. 6,159,327, a transverse distance between film guide members provided along a film transfer path is adapted to a width of a film used and fixed beforehand, since the system has no function to align the film being transferred along a desired side of the film transfer path. ID cards are treated by a card printer to have various surfaces according to uses. Accordingly, in order to laminate a film on one of such ID cards, the film need to be chosen according to the surface of the ID card. However, in the lamination system of the prior art, it has been impossible to laminate a surface of an ID card with a film chosen from films different in width, using an identical lamination system.

Further, although each of two laminate films having different width with each other can be laminated on a face or a back of an ID card in the lamination system disclosed in U.S. Pat. No. 6,159,327, there has been still a problem that it is impossible to laminate each of arbitrary combined films each having a different width on the face or the back of the ID card respectively.

These problems have adverse effects on the convenience of the system for users, and consequently, prevent tamper-resistant and long life ID cards from spreading.

SUMMARY OF THE INVENTION

It is an object of the present invention to solve the above problems and to provide a lamination system that is capable of laminating a surface of an ID card with a laminate film chosen from laminate films different in width by practicing the lamination while aligning the laminate film along a desired side end of a film transfer path, and that yields a minimum of waste laminate films and thus contributes to the protection of environment as well as to the reduction of the operational cost.

To achieve the above object, a lamination system according to the present invention comprises; a film transfer means for transferring along a first transfer path a continuous film chosen from more than two kinds of films different in width, having a heat adhesive layer on a surface and drawn out from a supply roll, a cutting means provided along the first transfer path for cutting the film in a predetermined length, a card transfer means for transferring an ID card along a second transfer path that converges with the first transfer path at a predetermined point of conversion, a thermocompression bonding means for laminating the film cut and laid on a surface of the ID card with the ID card at the downstream of the point of conversion. The lamination system is provided with a set of guide members for restricting the transverse movement of the film within a distance corresponding to the maximum width of the films, and alignment means for aligning the film along a desired side end of the first transfer path.

In the lamination system according to the present invention, it is possible to laminate a film chosen from films different in width according to a surface of an ID card on a desired part of a surface of the ID card. Further, it is possible to laminate each of arbitrary combined such films on a corresponding desired part of each of surfaces of the ID card. Furthermore, the lamination system according to the present invention yields a minimum of waste laminate film and thus contributes to the protection of environment as well as to the reduction of the operational cost, since the laminate film is used after being cut in a necessary length.

BRIEF DESCRIPTION OF THE DRAWINGS

FIG. 13 is a schematic perspective view of a printed ID card, on the surface of which a magnetic stripe is provided and a laminate film is laminated.

FIG. 14 is a schematic perspective view of another printed ID card, on the surface of which a magnetic stripe is provided and a laminate film is laminated.

FIG. 15 is a schematic perspective view of a printed ID card, on the surface of which no magnetic stripe is provided and a laminate film is laminated.

DETAILED DESCRIPTION OF THE INVENTION

Figure 1:
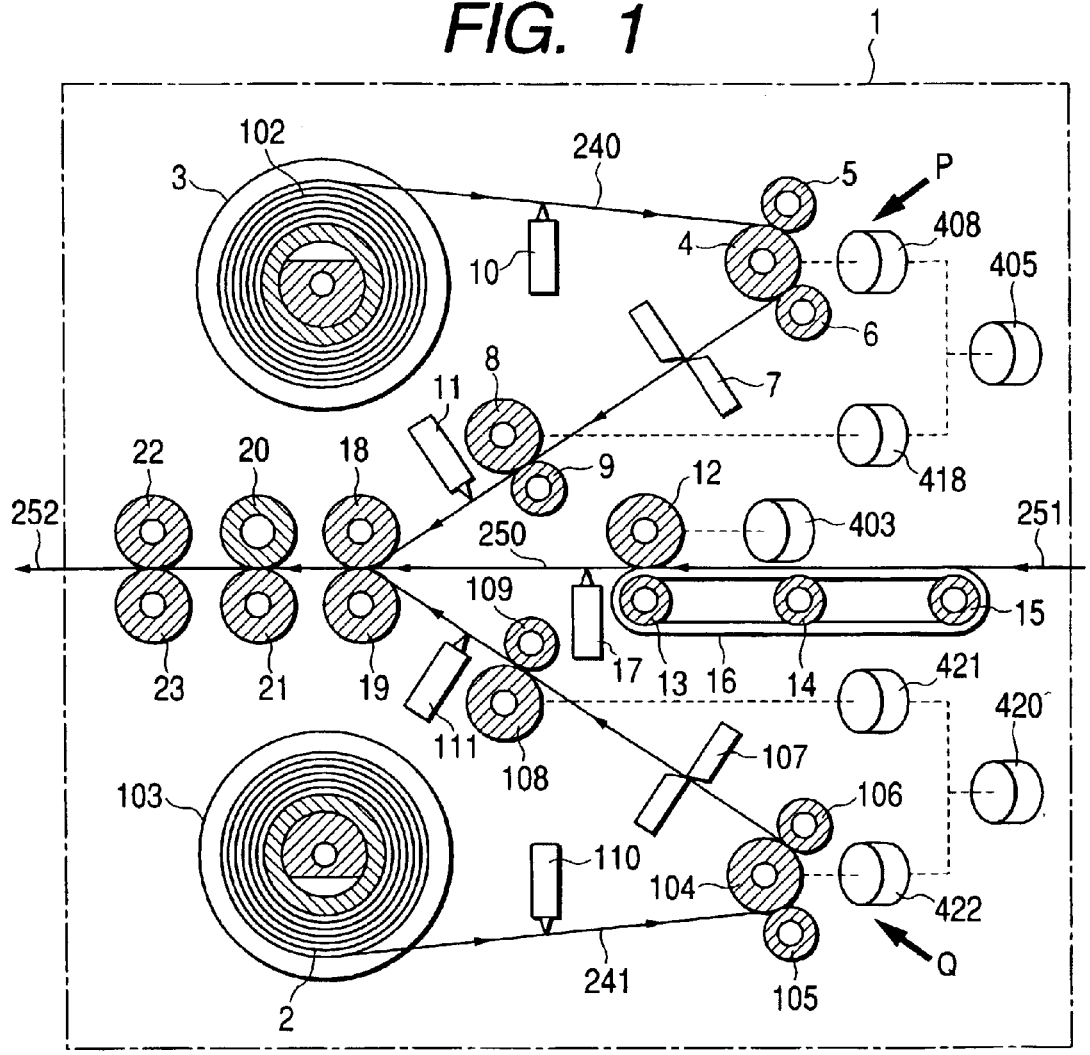
FIG. 1 is a schematic front view of a wasteless type lamination system according to the present invention.

FIG. 1 shows a front view of a lamination system 1 according to the present invention. This lamination system 1 laminates films on both surfaces of an ID card.

A continuous transparent laminate film in a form of a supply roll 102 is loaded on a supply spindle 3. A leading edge of the laminate film is drawn out from the supply roll 102 and transferred along a film transfer path 240 that is a first transfer path. A laminate film supply monitoring sensor 10 composed of an optical sensor represented by a reflective type optical sensor is provided along the film transfer path 240 and monitors the supply of the continuous laminate film. The continuous laminate film is hung on a roller 4, then passed between two cutting blades of a cutter 7 of a cutting means, then transferred between rollers 8 and 9, and then transferred under a film detection sensor 11 composed of an optical sensor also represented by a reflective type optical sensor. A transfer means comprises the rollers 4 to 6, 8, 9. Additionally, a distance L between the cutter 7 and the film detection sensor 11 is set to be a predetermined design value of the system.

As shown in FIG. 1, another film transfer path 241 that is another first transfer path is also provided at the other side of a card transfer path 250 that will be referred to later. The film transfer path 241 is approximately symmetrical to the film transfer path 240 concerning the card transfer path 250. Similarly to the film transfer path 240, a transparent continuous laminate film in a form of a supply roll 2 is also loaded on a supply spindle 103. A leading edge of the laminate film is drawn out from the supply roll 2 and transferred along a film transfer path 241. A laminate film supply monitoring sensor 110 composed of an optical sensor represented by a reflective type optical sensor is provided along the film transfer path 241 and monitors the supply of the continuous laminate film. The continuous laminate film is hung on a roller 104, then passed between two cutting blades of a cutter 107 of a cutting means, then transferred between rollers 108 and 109, and then transferred under a film detection sensor 111 composed of an optical sensor also represented by a reflective type optical sensor. A transfer means comprises the rollers 104 to 106, 108, 109. Additionally, a distance L between the cutter 107 and the film detection sensor 111 is also set to be a predetermined design value of the system.

On the other hand, a printed ID card is put into an inlet 251 of the lamination system 1. Then, the printed ID card is transferred on a belt 16 driven by rollers 13 to 15, then transferred along the card transfer path 250, that is a second transfer path, being held by the belt 16 located on the roller 13 and a roller 12 opposing to the belt 16, and then transferred to a point of convergence at which the film transfer path 240, the film transfer path 241 and the card transfer path 250 converge, after being positioned for registration using a detection signal detected by a card edge detection sensor 17 composed of an optical sensor also represented by a reflective type optical sensor. The rollers 12 to 15 and the belt 16 compose a card transfer means.

As explained above, the film transfer path 240 and the film transfer path 241 are composed approximately symmetrical each other and their functions are similar. So, in order to avoid repetition of explanation for such as transfer control process and cutting process of the laminate films, the explanation will be made concerning mainly the film transfer path 240. Each reference numeral for an element concerning the film transfer path 241 is given in parentheses attached to corresponding reference numeral for an element concerning the film transfer path 240.

In the film transfer path 240(241), drive force of a laminate film transfer motor 405(420) is transmitted to the roller 4(104) through a laminate load electric clutch 408 (422). The drive force is further transmitted to rollers 5(105) and 6(106) through the roller 4(104) and the respective gears (not illustrated). Similarly, the drive force is transmitted to a cylindrical roller 8(108) through a laminate feed electric clutch 418(421), and from the cylindrical roller 8(418) to a conic roller 9(109) through a gear (not illustrated).

In this embodiment, a stepping motor is adopted as the laminate film transfer motor 405(420). Since an amount of rotation of a stepping motor can be precisely and easily controlled by controlling a number of drive pulses, amounts of rotation of the roller 4(104) and the cylindrical roller 8(108) can also be precisely and easily controlled. Further, by combining on/off controls of the laminate load electric clutch 408(422) and the laminate feed electric clutch 418 (421) with the rotation control of the motor, transfer of the laminate film can be made minutely.

A card transfer motor 403 is also provided with a card transfer system and a stepping motor is also adopted.

Accordingly, transfer of a card can be minutely controlled by controlling a number of drive pulses for the card transfer motor 403. Drive force of the card transfer motor 403 is transmitted to a roller 12, and then from a drive shaft (not illustrated) of the roller 12 to rollers 13 and 18, a heat roller 20 and a roller 22 through such as gears and/or synchronous belts (not illustrated). The drive force is further transmitted from these rollers to rollers opposing to these rollers through the respective gears (not illustrated). Additionally, the laminate film transfer motor 405(420) can be omitted. In this case, the drive force of the card transfer motor 403 is transmitted to the rollers in the film transfer system through electric clutches. The control of the transfer of the laminate film can also be made similar to that explained above. Further, a servomotor such as a rotary encoder with a number of rotation sensor can be used as the drive source in place of the stepping motor. In this case, control of the transfer can also be made similarly to the case explained above.

Figure 2:
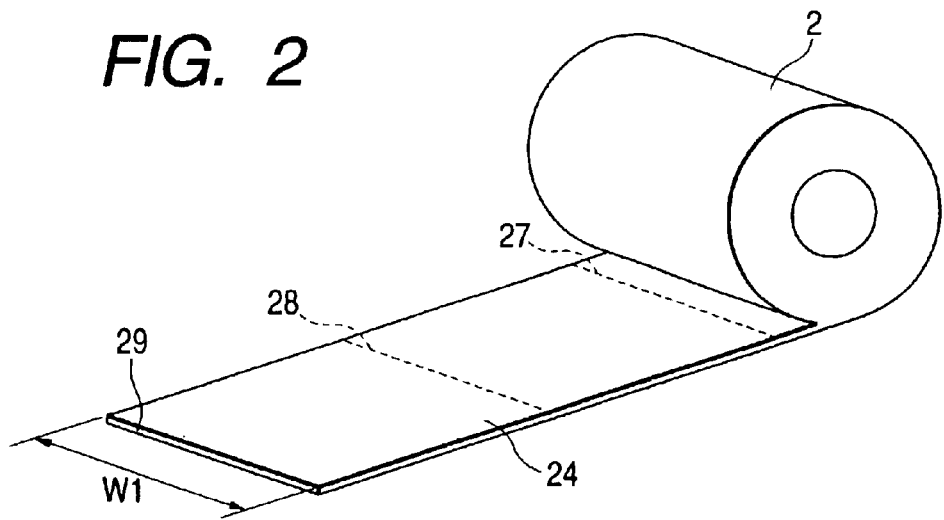
FIG. 2 is a schematic perspective view of a supply roll of a laminate film suitable for use in the practice of the present invention.

FIG. 2 shows an example of a supply roll 2 of a laminate film 24 suitable for use in the lamination system 1 according to the present invention. As shown, the leading edge 29 of the continuous laminate film 24 having a width W1 is drawn out from the supply roll 2 and cut successively along a cutting line 28, a cutting line 27 and so forth by the cutter 7. The continuous laminate film 24 may be a transparent film, or may be a film treated to have a hologram surface for preventing from forgery.

Figure 3:
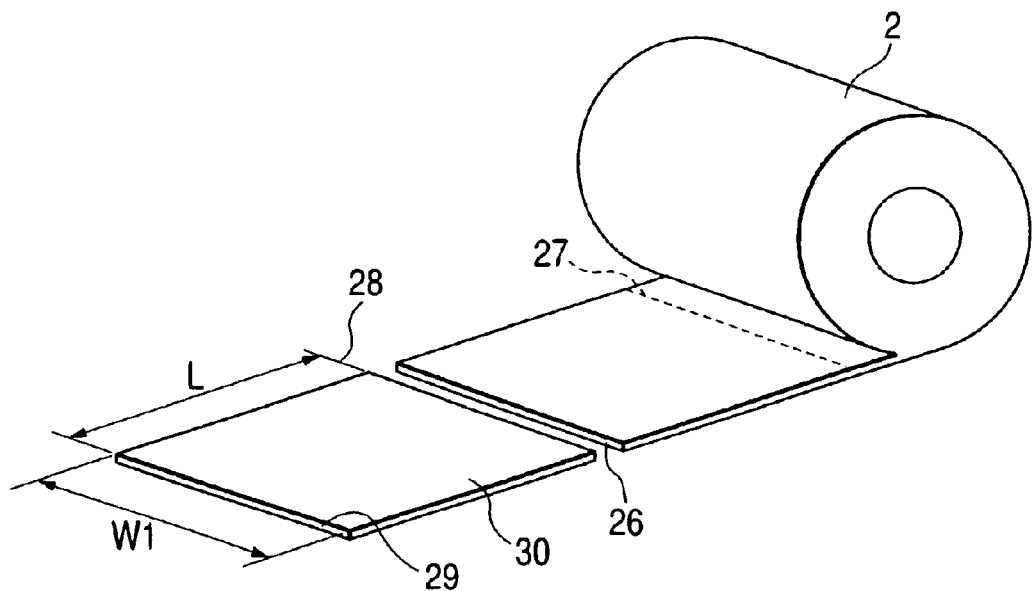
FIG. 3 is a schematic perspective view of the supply roll of the laminate film in FIG. 2 after the laminate film is cut from the supply roll.

FIG. 3 shows the cut laminate film 30. As shown, the continuous laminate film 24 is cut along the cutting line 28 at a distance L from the leading edge 29. A cut edge 26 becomes a new leading edge of the continuous laminate film 24 to be cut next.

Figure 4:
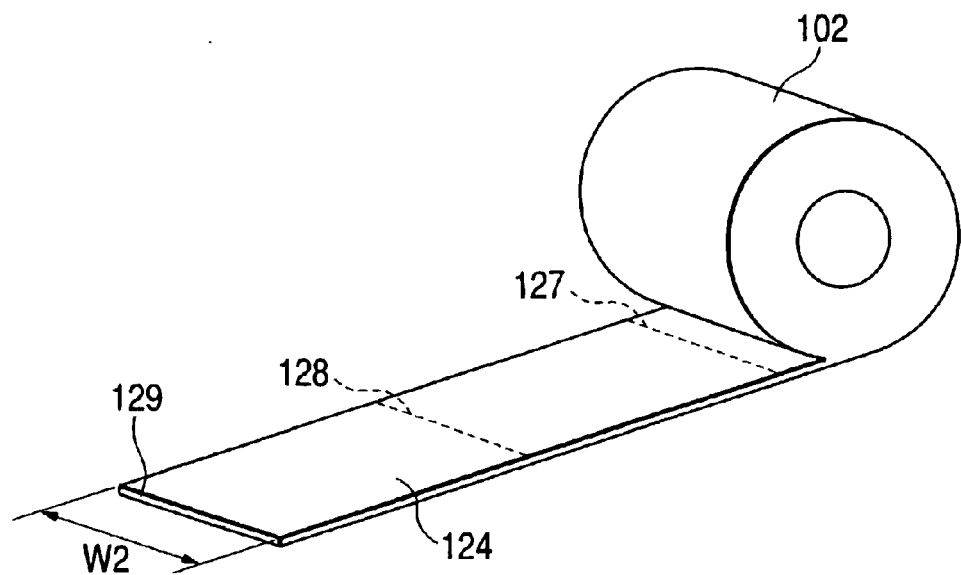
FIG. 4 is a schematic perspective view of another supply roll of a laminate film suitable for use in the practice of the present invention.

FIG. 4 shows another example of a supply roll 102 of a laminate film 124 also suitable for use in the lamination system 1 according to the present invention. As shown, the leading edge 129 of the continuous laminate film 124 having a width W2 is drawn out from the supply roll 102 and cut successively along a cutting line 128, a cutting line 127 and so forth by the cutter 107. The continuous laminate film 124 may also be a transparent film, or may be a film treated to have a hologram surface for preventing from forgery.

Figure 5:
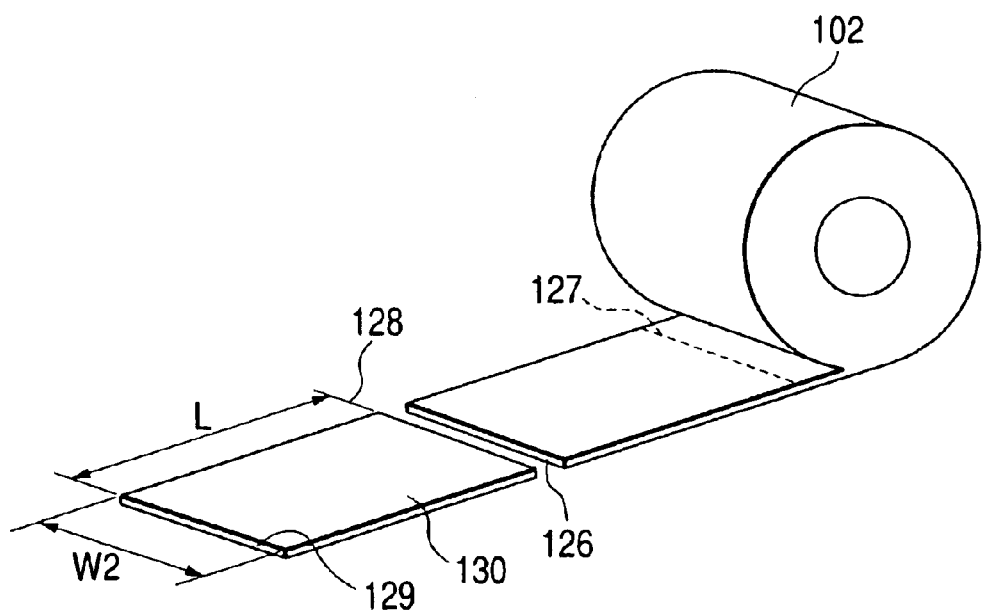
FIG. 5 is a schematic perspective view of the supply roll of the laminate film in FIG. 4 after the laminate film is cut from the supply roll.

FIG. 5 shows the cut laminate film 130. As shown, the continuous laminate film 124 is cut along the cutting line 128 at a distance L from the leading edge 129. A cut edge 126 becomes a new leading edge of the continuous laminate film 124 to be cut next.

Either of the width W1 and the width W2 may be larger than or smaller than the other, however, it is assumed to be W1>W2 for convenience of the following explanation.

Each of the cut laminate film 30 and the cut laminate film 130 is laid on the face or the back of the printed ID card 31 respectively at the point of convergence at which the film transfer path 240, the film transfer path 241 and the card transfer path 250 converge, then the printed ID card 31 and the cut laminate films 30, 130 are transferred to a place between the heat rollers 20, 21 composing a thermocompression bonding means provided at the downstream, and are laminated by thermocompression bonding. After that, the laminated ID card 31 is transferred through rollers 22 and 23 to be discharged from an outlet 252.

Figure 6:
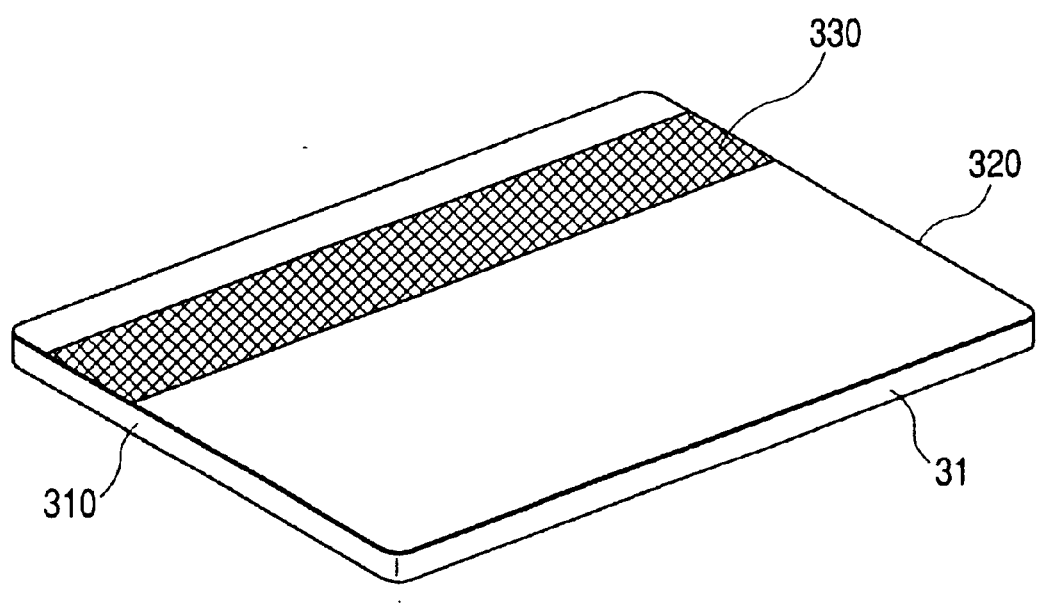
FIG. 6 is a schematic perspective view of a printed ID card having a magnetic stripe and suitable to be treated by the lamination system according to the present invention.

FIG. 6 shows an example of a printed ID card 31 having a magnetic stripe 330 and suitable to be treated by the lamination system according to the present invention.

An ID card being practically used in general may not be provided with a medium such as a magnetic stripe. Another ID card also being practically used in general may be provided with a magnetic stripe, such as shown in FIG. 6, for reading and/or writing magnetic information on a surface of the ID card.

The reading and/or the writing of the magnetic information is made closely contacting the magnetic stripe to a magnetic head (not illustrated). Accordingly, care should be taken not to laminate a film on the magnetic stripe. The width W2 of the supply roll 102 shown in FIG. 4 is determined to be conformable to be used for laminating the ID card 31 on a surface of which such magnetic stripe 330 is provided. Position of the magnetic stripe 330 on the surface of the ID card 31 is prescribed by such as ISO standard.

The lamination system 1 is usually directly connected to a card printer (not illustrated), in which such as printing and/or magnetic encoding are(is) made, and from which the lamination system 1 is supplied with the printed ID card 31. When the printed ID card 31 is put into the lamination system 1, whether the magnetic stripe 330 is located near to the left side end portion or to the right side end portion, or whether the magnetic stripe 330 is provided on the face or on the back of the ID card, is not determined beforehand. Accordingly, it is necessary that laminate films having widths conformable to the input ID card 31 are chosen from laminate films different in width, and each of such laminate films is laminated on the face or on the back of the ID card 31 in the lamination system 1.

For example, in case that the ID card 31 as shown in FIG. 6 is input into the lamination system 1 with its surface on which the magnetic stripe 330 is provided upward and with its one end 310 forward, the supply roll 102 having width W2 is loaded on the supply spindle 3, whereas the supply roll 2 having width W1 is loaded on the supply spindle 103. Then, the continuous laminate film 124(24) drawn out from the supply roll 102(2) is transferred along the film transfer path 240(241), and successively cut in the cutting process as follows.

Figure 7:
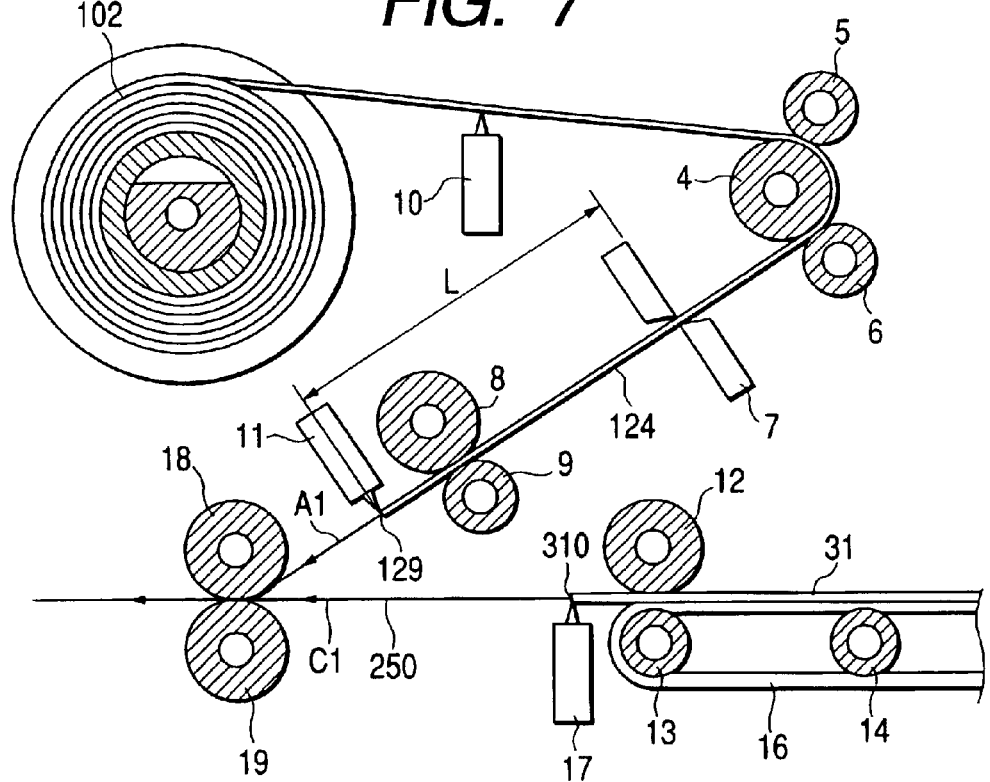
FIG. 7 shows a state immediately before a laminate film is cut in the lamination system according to the present invention.
Figure 8:
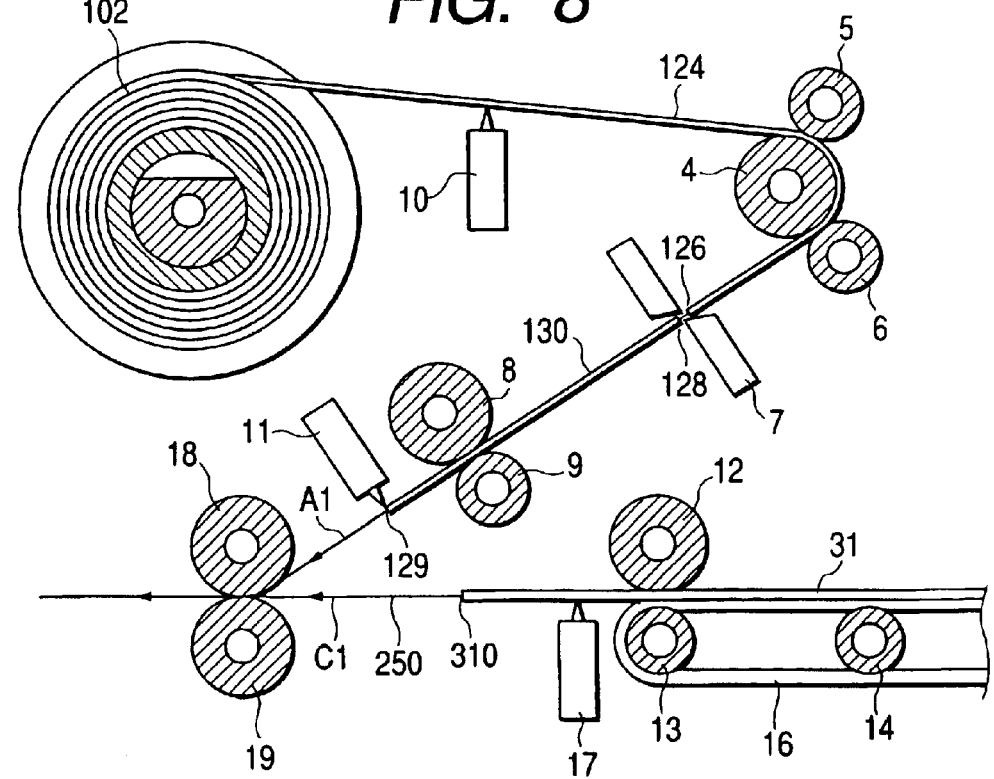
FIG. 8 shows a state immediately after the laminate film is cut in the lamination system according to the present invention.

Each of FIGS. 7 and 8 shows a part of the lamination system 1 according to the present invention. In these figures, FIG. 7 shows a process to determine a position at which the laminate film 124(24) is to be cut, whereas FIG. 8 shows a state immediately after the laminate film 124(24) is cut.

In the following explanation, both of the laminate load electric clutch 408(422) and the laminate feed electric clutch 418(421) are in "on-state" to be capable of transmitting drive forces. The leading edge 129(29) of the continuous laminate film 124(24) drawn out from the supply roll 102(2), being driven by the laminate film transfer motor 405(420), passes between two blades of the cutter 7(107), then reaches under the film detection sensor 11(111), and is detected by the film detection sensor 11(111). Then, an out put signal of the film detection sensor 11(111) becomes activated. When the film detection sensor 11(111) becomes activated, the lamination system 1 judges that the distance between the leading edge 129(29) of the continuous laminate film 124(24) and the cutter 7(107) has reached the predetermined length L to be cut and stops the laminate film transfer motor 405(420) to stop temporarily the transfer of the laminate film 124(24). Then, the cutter 7(107) is driven to make the cut laminate films 130(30) having the length L on the film transfer path 240(241), as shown in FIG. 8. After that, the laminate load electric clutch 408(422) is made "off-state" and the laminate film transfer motor 405(420) is driven again. The drive force of the laminate film transfer motor 405(420) is transmitted through the laminate feed electric clutch 418(421) to the cylindrical roller 8(108) and then to the conic roller 9(109), and the cut laminate films 130(30) is transferred in the direction indicated by an arrow A1 in FIG. 8.

Figure 9:
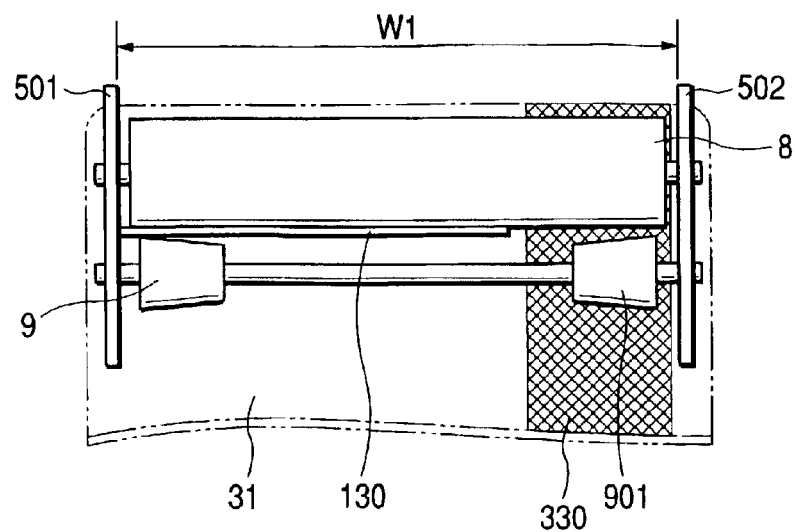
FIG. 9 shows a positional relation between a cut laminate film and a printed ID card having a magnetic stripe, looked from a direction indicated by an arrow P in FIG. 1.
Figure 10:
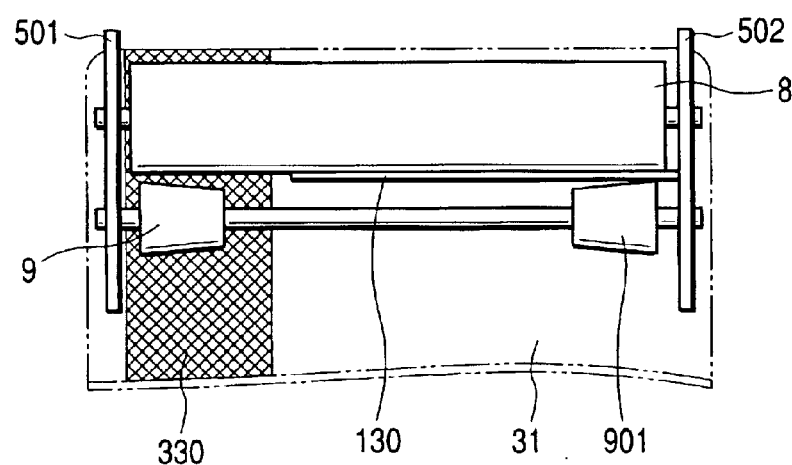
FIG. 10 shows another positional relation between a cut laminate film and a printed ID card having a magnetic stripe, looked from a direction indicated by an arrow P in FIG. 1.
Figure 11:
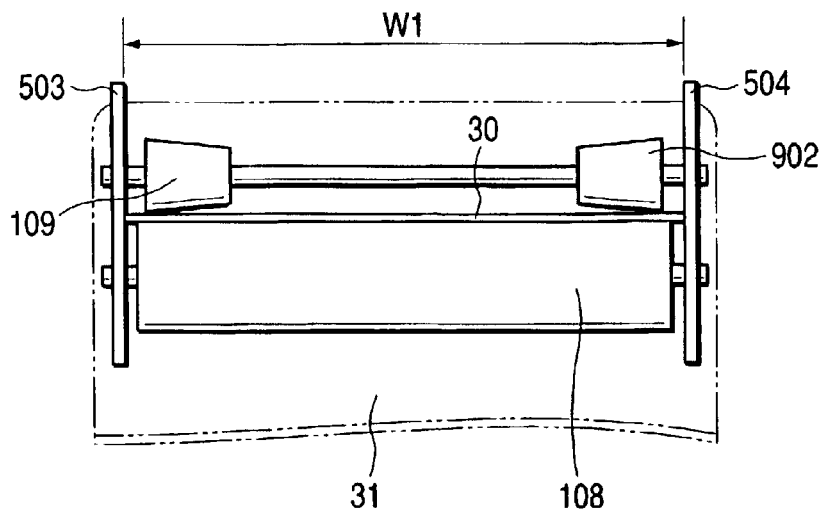
FIG. 11 shows a positional relation between a cut laminate film and a printed ID card having no magnetic stripe on its surface, looked from a direction indicated by an arrow Q in FIG. 1.

Then, the cut laminate films 130(30) is laid on the face(back) of the ID card 31 at the point of convergence at which the film transfer path 240(241) and the card transfer path 250 converge. Positional relations between the cut laminate film 130(30) and the printed ID card 31 at the time when the cut laminate films 130(30) is laid on the face(back) of the ID card 31 are shown in FIGS. 9 to 11. In these figures, FIG. 9 shows a positional relation between the cut laminate film 130 and the printed ID card 31 having the magnetic stripe on the face, looked from a direction indicated by an arrow P in FIG. 1, whereas FIG. 10 shows another positional relation between the cut laminate film 130 and another printed ID card 31 having the magnetic stripe on the face, looked also from a direction indicated by the arrow P in FIG. 1, and FIG. 11 shows a positional relation between the cut laminate film 30 and the printed ID card 31 having no magnetic stripe on the back, looked from a direction indicated by an arrow Q in FIG. 1.

As shown in these figures, each of guide plates 501, 502(503, 504) composing guide members is provided along each side end of the film transfer path 240(241) respectively. Distance between the guide plate 501(503) and the guide plate 502(504) corresponds to the largest width W1 of the laminate film. Thus, transverse movement of the laminate film is restricted within the distance between the guide plate 501(503) and the guide plate 502(504).

Further, an alignment means for aligning the laminate film along a desired side end of the film transfer path 240(241) is provided in the lamination system 1 according to the present invention. The alignment means comprises a pair of conic rollers 9, 901(109, 902) arranged in a line transversally crossing the film transfer path 240(241) and each of the conic rollers 9, 901(109, 902) are provided to oppose the cylindrical roller 8(108). These conic rollers 9, 901(109, 902) are made of an elastic material and a diameter of each of the conic rollers 9, 901 (109, 902) nearer to the corresponding side end of the film transfer path 240(241) is made to be larger than that nearer to the central portion of the film transfer path 240(241).

By such alignment means, a force that presses the laminate film 130(30) to move toward the guide plate 501(503) or toward the guide plates 502(504) is applied to the laminate film 130(30) being transferred, while being held between the cylindrical roller 8(108) and the conic roller 9(109) and/or 901(902). Accordingly, the laminate film 130(30) is aligned along the desired side end of the film transfer path 240(241).

Additionally, in place of a pair of conic rollers, a roller (not illustrated) of which diameters at end portions are larger than that at the central portion can be used. Also in this case, similar effect to that of a pair of conic rollers can be achieved.

In the example shown in FIG. 9, the ID card 31 is put into the lamination system 1 with its face on which the magnetic stripe 330 is provided upward and with its one end 310 forward. In this case, the supply roll 102 having width W2 is used and the laminate film 130 is drawn out and transferred roughly along the guide plate 501, then with the progress of the transfer, the laminate film 130 becomes to be transferred with the end portion of the laminate film 130 nearer to the guide plate 501 aligned along the guide plate 501, by the action of the conic roller 9.

In another example shown in FIG. 10, the ID card 31 is put into the lamination system 1 with its face on which the magnetic stripe 330 is provided upward and with its another end 320 forward. In this case, the supply roll 102 having width W2 is used and the laminate film 130 is drawn out and transferred roughly along the guide plate 502, then with the progress of the transfer, the laminate film 130 becomes to be transferred with the end portion of the laminate film 130 nearer to the guide plate 502 aligned along the guide plate 502, by the action of the conic roller 901.

Further, in the example shown in FIG. 11, the ID card 31 is put into the lamination system 1 with its face on which the magnetic stripe 330 is provided upward and with its back on which the magnetic stripe is not provided downward. In this case, the supply roll 2 having width W1 is used and the laminate film 30 is drawn out and transferred being roughly placed between the guide plate 503 and the guide plate 504, then with the progress of the transfer, the laminate film 30 becomes to be transferred with each end portion of the laminate film 30 aligned along the guide plate 503 or 504 respectively, by the action of the conic roller 109 and the conic roller 902.

Now, a controller adopted in the lamination system 1 according to the present invention is explained.

Figure 12:
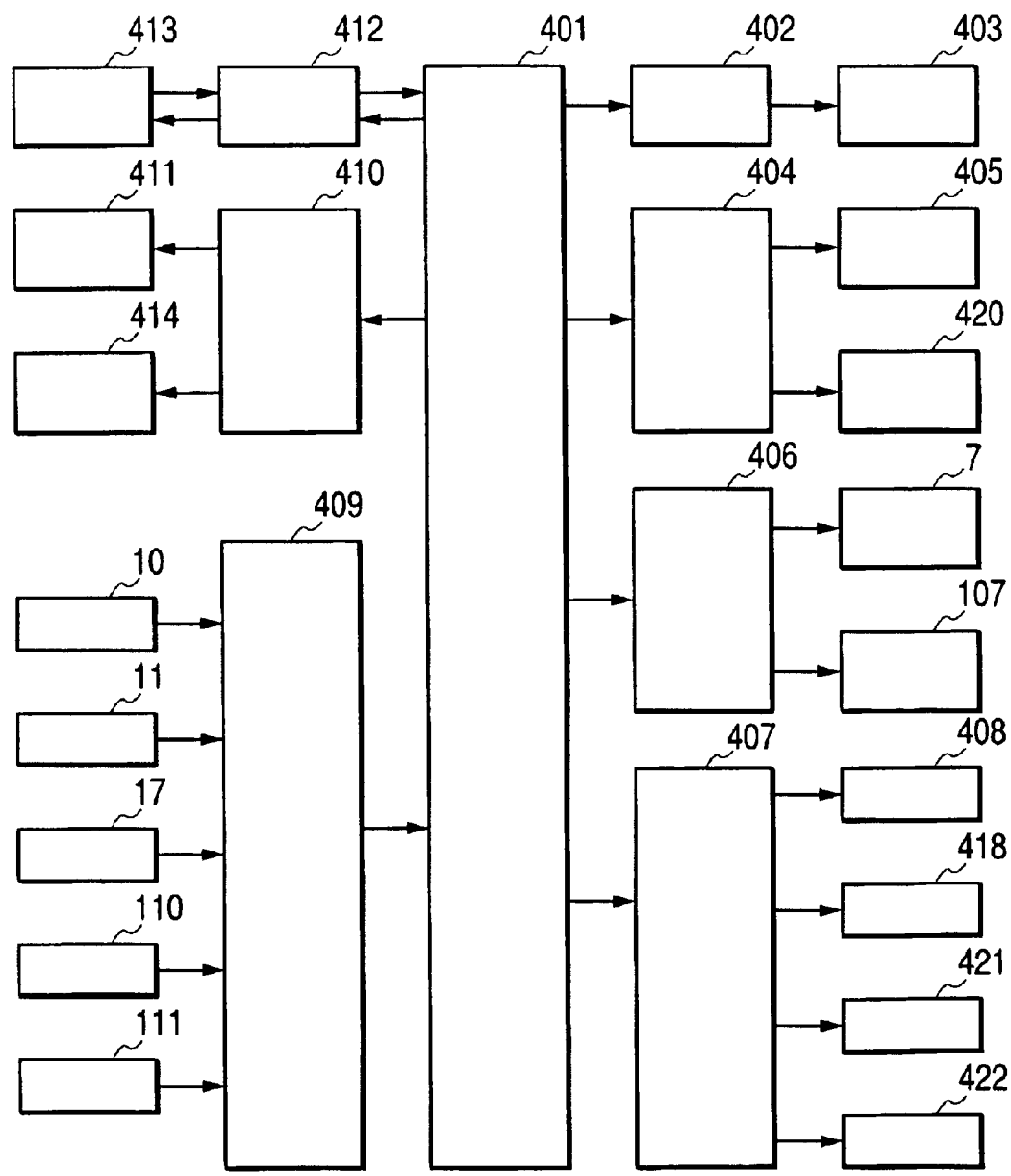
FIG. 12 is a block diagram of a controller adopted in the lamination system according to the present invention.

FIG. 12 is a block diagram of a controller mounted in the lamination system 1. The controller comprises; a central signal processing unit 401 composed of micro processors and the like, a card transfer control circuit 402, a card transfer motor 403, a laminate film transfer control circuit 404, laminate film transfer motors 405, 420, a cutter drive circuit 406, a clutch drive circuit 407, laminate load electric clutches 408, 422, laminate feed electric clutches 418, 421, a sensor signal processing circuit 409, a heater temperature control circuit 410, heaters 411, 414, a control panel signal processing circuit 412 and a control panel 413.

The laminate load electric clutch 408(422) is used to connect or disconnect driving force of the laminate film transfer motor 405(420) to the roller 4(104). The laminate feed electric clutch 418(421) is used to connect or disconnect driving force of the laminate film transfer motor 405 (420) to the cylindrical roller 8(108). The rollers 5(105) and 6(106) are connected to the roller 4(104) through gears provided with respective shafts (not illustrated). Also, The rollers 8(108) and 9(109) are connected with each other through gears (not illustrated). The rollers provided along the card transfer path 250 are driven by the card transfer motor 403.

Operation of the controller with regard to the lamination system 1 according to the present invention is as follows.

First, the central signal processing unit 401 instructs, through the laminate film transfer control circuit 404, the laminate film transfer motor 405(420) to rotate to draw out the continuous laminate film 124(24) from the supply roll 102(2). At the same time, the laminate load electric clutch 408(422) and the laminate feed electric clutch 418(421) are activated, the roller 4(104) and the cylindrical roller 8(108) are rotated being synchronized with each other, and the laminate film 124(24) is transferred until the leading edge 129(29) reaches a responsive position of the film detection sensor 11 (111). When the leading edge 129(29) of the laminate film 124(24) reaches the responsive position of the film detection sensor 11 (111), the output signal of the film detection sensor 11(111) becomes activated. The activated output signal is transmitted through the sensor signal processing circuit 409 to the central signal processing unit 401. The central signal processing unit 401 stores temporarily the point at which the activated signal is transmitted as a position information in an internal memory. The position information is used later as a reference point for transmitting the cut laminate film 30 into the downstream synchronized with the transfer of the printed ID card 31. At the same time, the laminate film transfer motor 405(420) is stopped and the cutter 7(107) is driven through the cutter drive circuit 406. After the laminate film 124(24) is cut, the central signal processing unit 401 instructs the laminate film transfer motor 405(420) to rotate to transfer the cut laminate film 130(30) in the direction indicated by an arrow A1 in FIG. 8.

On the other hand, the output signal of the card edge detection sensor 17 that detects the leading edge of the printed ID card 31 is transmitted to the central signal processing unit 401 through the sensor signal processing circuit 409. The point at which the leading edge of the printed ID card 31 is detected is temporarily stored as the position information in the internal memory of the central signal processing unit 401 and referred to as the reference point for the succeeding control of the transfer of the printed ID card 31. Thus, the printed ID card 31 is transferred along the card transfer path 250 shown in the direction indicated by an arrow C1 in FIG. 8. The amount of the transfer of the printed ID card 31 is controlled by the rollers such as the roller 12 connected to the card transfer motor 403 that is controlled by a command pulse signal.

Similarly, each of the cut laminate film 130 and the cut laminate film 30 is further transferred being synchronized with the printed ID card 31 along the laminate film transfer path 240 or the laminate film transfer path 241 respectively, and laid on the face or the back of the printed ID card 31 respectively at the point of convergence of the film transfer path 240, the film transfer path 241 and the card transfer path 250. Then the cut laminate films 130, 30 and the printed ID card 31 are transferred to the place between the heat roller 20 and the heat roller 21 provided at the downstream. In each of the central portions of the heat rollers 20, 21, the heater 411 or the heater 414 is provided respectively. The heaters 411, 414 are controlled by the heater temperature control circuit 410 to make the temperature at the surface of the heat rollers 20, 21 proper for the lamination. Thus, each of the cut laminate film 130 and the cut laminate film 30 is certainly laminated on the face or the back of the printed ID card 31 respectively by thermocompression bonding.

Examples of the laminated ID cards are shown in FIGS. 13 to 15.

In the example shown in FIG. 13, the laminate film 130 is laminated on a part, where the magnetic stripe 330 is not provided, of the face of the ID card 31 put into the lamination system 1 with its one end 310 forward. Additionally, each of approximately even blank spaces 311 to 314 necessary to prevent the laminate film 130 from peeling off is provided between each side of the laminate film 130 and corresponding side of the ID card 31 or side of the magnetic stripe 330.

In the example shown in FIG. 14, the laminate film 130 is laminated on a part, where the magnetic stripe 330 is not provided, of the face of the ID card 31 put into the lamination system 1 with its another end 320 forward. Blank spaces 311 to 314 are also provided.

In the example shown in FIG. 15, the laminate film 30 is laminated on a surface on which the magnetic stripe 330 is not provided. Blank spaces 311 to 314 are also provided.

In the above explanation of the present invention, the explanation is made for a case in which the card transfer motor 403, the laminate film transfer motor 405 and the laminate film transfer motor 420 are provided separately as the drive sources of the lamination system. However, it is quite apparent that the same effects of the present invention can be achieved using a single motor connected to a plurality of electric clutches to connect/disconnect drive force to the respective rollers.

Also, although the explanation is made for a case in which the reflective type optical sensors are used as the sensors for detecting such as the laminate film and the printed ID card, it is also quite apparent that the same effects of the present invention can be achieved using sensors of another types.

Additionally, PVC are being generally used as the materials of the ID card to be laminated. The lamination system of the present invention can be used for a card made of a composite material such as PET-G, and further, the lamination system of the present invention can be used for any card regardless of the material of which the card is made. Further, the object to be laminated by the lamination system 1 of the present invention is not limited to ID cards. The lamination system 1 of the present invention is applicable to a lamination of a continuous film, being successively cut, on a substrate in the form other than ID card by modifying accordingly.

In the embodiment of the lamination system 1 according to the present invention, explanation is made for the lamination system 1 for laminating both surfaces of the ID card 31, however, one of the film transfer paths may be omitted and the lamination system can be used for laminating one surface of a card with a film chosen from films different in width.

In the lamination system 1 according to the present invention as explained above, each of the guide plates 501, 502(503, 504) for restricting the transverse movement of the laminate film is provided along each side of the film transfer path 240(241), and further, the alignment means comprising a pair of conic rollers 9, 901(109, 902) for aligning a laminate film having a different width along the desired side end of the film transfer path 240(241) is provided. Accordingly, it is possible to laminate a film chosen from films different in width on a desired part of one surface of a card, or to laminate each of films chosen from films different in width on a desired part of each of both surfaces of a card.

Additionally, the alignment means can be composed of a roller of which diameters at end portions are larger than that at the central portion in place of a pair of conic rollers.

What is claimed is:

1. A lamination system comprising; a film transfer means for transferring along a first transfer path a continuous film chosen from more than two kinds of films different in width, having a heat adhesive layer on a surface and drawn out from a supply roll, a cutting means provided along said first transfer path for cutting said film in a predetermined length, a card transfer means for transferring an ID card along a second transfer path that converges with said first transfer path at a predetermined point of conversion, a thermocompression bonding means for laminating said film cut and laid on a surface of said ID card with said ID card at the downstream of said point of conversion, wherein a set of guide members for restricting the transverse movement of said film within a distance corresponding to the maximum width of said films, and alignment means for aligning said film along a desired side end of said first transfer path are provided;

and wherein said alignment means comprises a pair of conic rollers, opposing to a cylindrical roller composing said film transfer means to hold said film between said conic rollers and said cylindrical roller, and a diameter of each of which nearer to the corresponding side end of said first transfer path is larger than that nearer to the central portion of said first transfer path.

2. The lamination system according to claim 1 further comprising another film transfer means for transferring along another first transfer path another continuous film chosen from more than two kinds of films different in width, having a heat adhesive layer on a surface and drawn out from another supply roll, another cutting means provided along said another first transfer path for cutting said another film in said predetermined length, another set of guide members for restricting the transverse movement of said another film within a distance corresponding to the maximum width of said films, and another alignment means for aligning said another film along a desired side end of said another first transfer path, wherein said another first transfer path converges with said first transfer path and said second transfer path at said point of conversion, each of said film cut and said another film cut is laid on a face or on a back of said ID card and laminated by said thermocompression bonding means respectively.

* * * * *